UNITED STATES PATENT OFFICE.

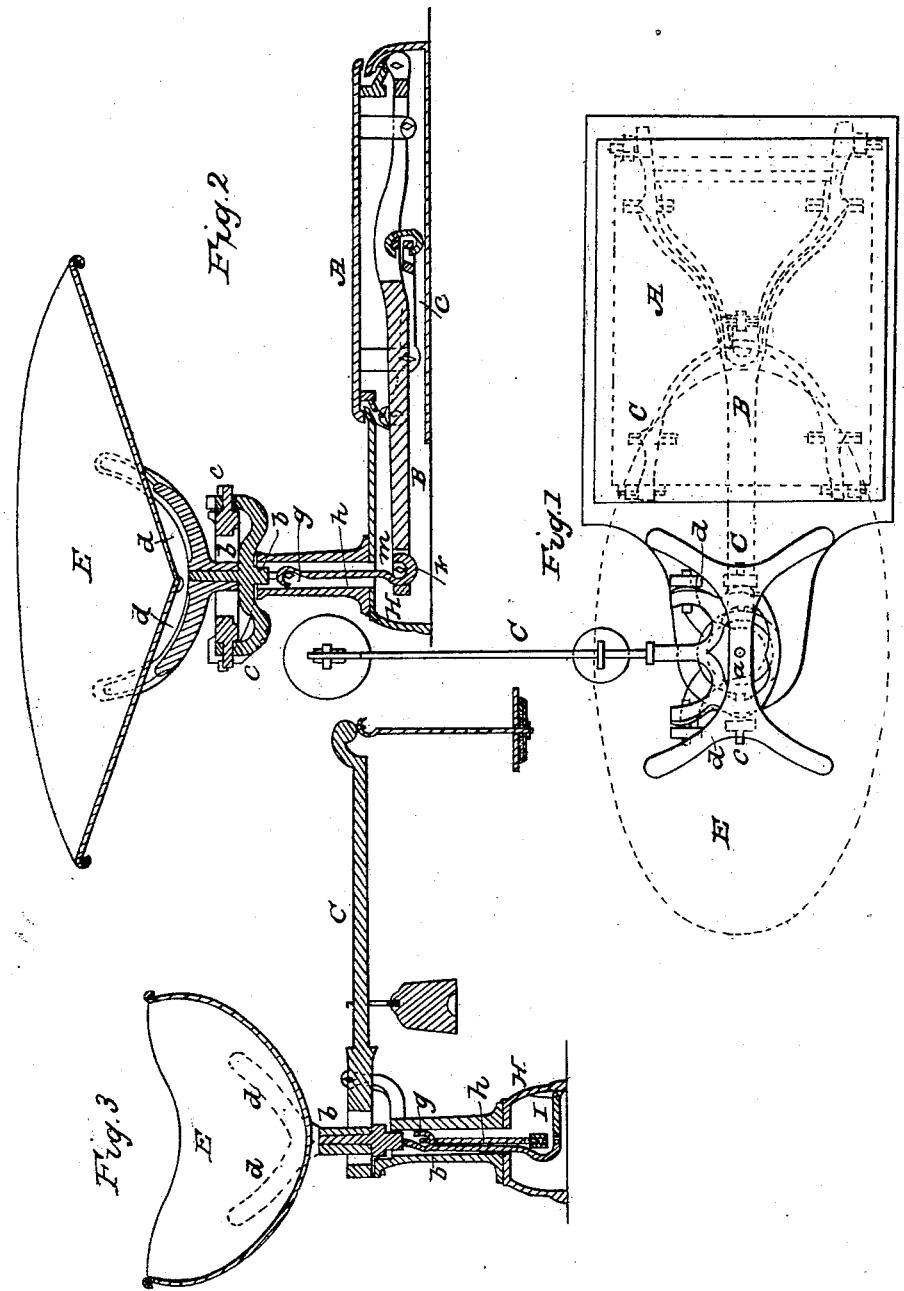

AUGUSTUS SANBORN, OF ST. JOHNSBURY, VERMONT, ASSIGNOR TO C. & T. FAIRBANKS & CO.

UNION PLATFORM-SCALE.

Specification of Letters Patent No. 13,331, dated July 24, 1855.

*To all whom it may concern:*

Be it known that I, AUGUSTUS SANBORN, of St. Johnsbury, in the county of Caledonia and State of Vermont, have invented a new and useful Improvement in the Platform-Balances for Weighing; and I do hereby declare that the same is fully described and represented in the following specification and the accompanying drawings, letters, figures, and references thereof.

Of the said drawings, Figure 1, denotes a top view of a "Union platform scale" to which my improvement is applicable. Fig. 2, is a central, vertical and longitudinal section of the same. Fig. 3, is a transverse and vertical section of it, such being taken through its steelyard or weighing lever.

In this balance, A, in said figures exhibits the platform, which is mounted upon a system of levers B, C, as are others in other balances of this description, such being seen in Figs. 1, and 2, the former exhibiting them by dotted lines. In connection with such levers a graduated weighing lever or steelyard C, has generally been used, it having been connected to the longer lever B, by means of a vertical rod, $b$, suspended upon knife edges $c$, $c$, extended from the shorter arm of the steelyard or weighing lever. Above such rod there has been placed a pan, E, made of an elliptical or other proper shape, such pan being sustained in position by arms, $d$, $d$, projecting from the top of a cross bar, $a$, and the vertical rod, $b$. This pan serves for weighing light or powdered articles, such as sugar, flour, &c., or those which it may be difficult or inconvenient to weigh upon the platform, A. My invention or improvement does not consist in combining the pan, E, with the steelyard of a platform balance, so as to constitute a union of platform and pan with one graduated weighing lever, but it has reference only to the manner of connecting or combining the lever, B, of the platform levers with the rod, $b$, extending downward from the crossbar, $a$; and this I effect by means of a knife edge or point bearing, $g$, and an extra suspension or pendulous rod, $h$, depending from said knife edge bearing as seen in Figs. 2, and 3.

The knife edge bearing, $g$, is arranged at the upper part of the rod, $b$, which at its lower end is connected to the frame, H, of the platform by means of an arm I, jointed to said rod and said frame and made of a length between the axis of its joint pins equal to the distance between the fulcra or knife edges which support the steelyard, and those that support the cross bar, $a$.

Owing to the manner in which the platform levers are sustained within the frame or box of the platform they are free to play or move horizontally so as to impart to the longer lever, B, a vibrating movement, which may take place transversely or longitudinally with respect to it.

When the lever B, is directly connected or joined to the lower end of the rod, $b$, the vibratory movement above mentioned is liable to affect the rod, $b$, in such a manner as to prevent the steelyard from weighing correctly. In order to prevent this difficulty, I make use of the knife edge or point bearing, $g$, arranged at or near the upper part of the bar or rod, $b$; upon this knife edge bearing I place the eye of a pendulous rod, $h$, formed with a hook at its lower end as seen at, $k$, and I rest upon this hook the lever B, by means of a knife edge bearing, $m$. The rod, $h$, being free to move on the knife edge, $g$, and in any direction will allow of the vibratory movement of the platform lever without creating any such movement of the rod $b$, as may be detrimental or liable to prevent the steelyard from indicating the true weight of any article placed upon the platform.

I do not claim connecting the platform with the beam and steelyard by means of a rod depending from the latter, and applied both to the lever and steelyard by knife edge bearings or "loops" as this is a common method of connecting such parts in ordinary platform scales, but as my invention has references only to, or is an improvement on what is termed the "Union scale" or that having a pan and platform as specified.

What I claim—

Consists in the manner in which the platform lever B, and the vertical suspension rod, $b$, of the pan and steelyard are connected and supported, the rod, $b$, being jointed at its lower end to an arm, I, independent of the lever, B, and said lever connected to the rod, $b$, by means of a pendulous rod, $h$, and a pointed or knife edge bearing, $g$, arranged near the upper part of the rod $b$, as specified, the same while securing a vertical movement to the rod, $b$, (the only one which it should have) effecting the advantage of allowing the lateral vibrations of the lever B, to take place without disturbance of the steelyard or rod, $b$, as hereinbefore set forth.

In testimony whereof, I hereunto set my signature this nineteenth day of January A. D. 1855.

AUGUSTUS SANBORN.

Witnesses:
LEWIS C. PORTER,
P. H. WHITE.